C. F. RODIN.
SHOCK ABSORBER.
APPLICATION FILED JULY 22, 1919.
1,359,106.
Patented Nov. 16, 1920.
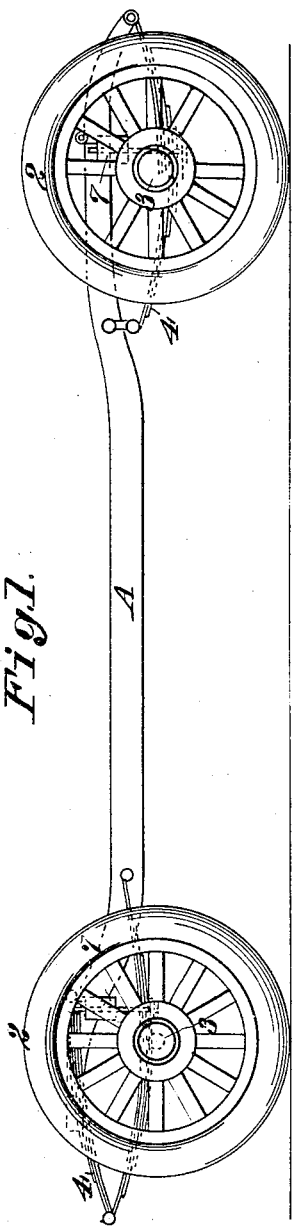
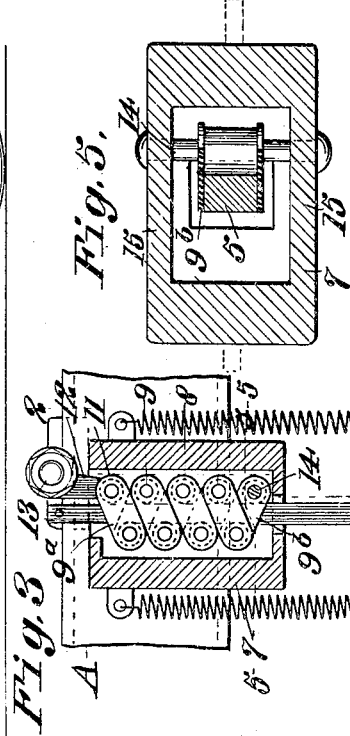
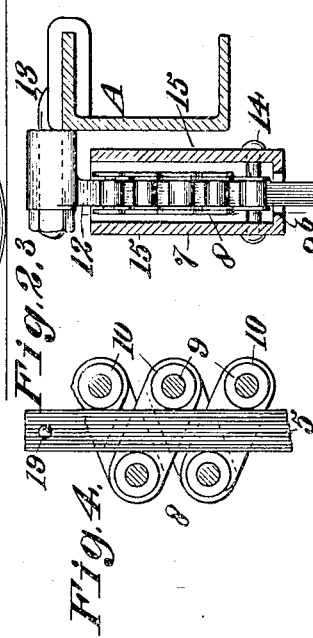
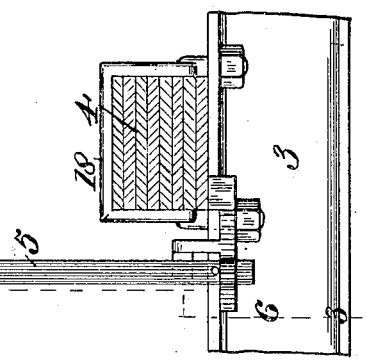
INVENTOR
Charles F. Rodin,
BY
Strong & Townsend.
ATTORNEYS

UNITED STATES PATENT OFFICE.

CHARLES F. RODIN, OF SAN FRANCISCO, CALIFORNIA.

SHOCK-ABSORBER.

1,359,106.   Specification of Letters Patent.   Patented Nov. 16, 1920.

Application filed July 22, 1919. Serial No. 312,630.

*To all whom it may concern:*

Be it known that I, CHARLES F. RODIN, a citizen of the United States, residing at the city and county of San Francisco and State of California, have invented new and useful Improvements in Shock-Absorbers, of which the following is a specification.

This invention relates to a shock absorber and particularly to means for checking rebound movements.

One of the objects of the present invention is to provide a simple, substantial and cheaply manufactured shock absorber for use on motor vehicles and the like, which is adapted to be interposed between the chassis and the springs in such a manner that a free compression of the springs is permitted; for instance, when a chuck hole is encountered while extension or rebound movement is resisted.

Another object of the invention is to provide a shock absorber in which the check or resistance is obtained by roller friction, which friction acts in one direction only, thereby permitting free movement in the opposite direction.

Further objects will hereinafter appear.

The invention consists of the parts and the construction, combination and arrangement of parts as hereinafter more fully described and claimed, having reference to the accompanying drawings, in which—

Figure 1 is a side elevation of a vehicle showing the application of the invention.

Fig. 2 is a central vertical section on line 2—2, Fig. 3.

Fig. 3 is a side elevation in section, taken on line 3—3, Fig. 2.

Fig. 4 is a detail view of a portion of the mechanism.

Fig. 5 is an enlarged plan section taken on line 5—5, Fig. 3.

Referring to the drawings in detail, A indicates the main or chassis frame of a vehicle; 2, the wheels supporting the same; 3, the axles; and 4, the springs by which the chassis or frame A is resiliently supported with relation to the axles and wheels.

It is well known that a vehicle, when traveling over uneven road surface is subject to considerable vibration even though springs of the semi-elliptical type or otherwise, are interposed between the chassis and the running gear. The vibration or shock, due to road surface, is greatest during the rebound and it is found that if the rebound movement can be checked, that riding qualities of the vehicle are improved and further, that the life of the springs is similarly increased as more springs are broken during the rebound movement than during the compression of the same, due to the catapult action of the chassis with relation to the running gear during the rebound movement.

The purpose of the present invention is to provide a certain mechanism, whereby the rebound movement can be materially cushioned or checked. It is accomplished in the present instance by providing a mechanism such as generally indicated in Figs. 2 and 3. This mechanism consists of a rod 5, preferably square or rectangular in cross section. This rod is secured at its lower end to a plate 6 which in turn is secured in any suitable manner to the axle 3, to which the spring 4 is also secured. The rod is vertically positioned and is in this instance extended to a point where it passes through a rectangular-shaped casing 7 in which is mounted a link chain 8. The several links of the chain are pivotally connected, as shown at 9, and a roller 10 is mounted on each pin 9 between the link sections, as shown at 10. The rod 5 passes between the interspaced links of the chain and the rollers 10 supported thereby. The rollers will therefore alternately engage opposite sides of the rod 5 and will, under certain conditions, exert a roller friction on the rod sufficient to check the rebound actions specified.

The uppermost link indicated at 9ª, is pivotally attached, as at 11, to a crank arm 12, which in turn is pivotally mounted on a pin 13 which is secured in any suitable manner to the chassis frame A. The lowermost link indicated at 9ᵇ is pivotally attached to a pin 14 which extends through the side walls 15 of the casing 7. The casing 7 is freely movable on the rod 5 and is normally pulled in a downward direction by means of a pair of coil springs 16. The rollers 10 carried by the link sections therefore have a tendency to frictionally engage the opposite sides of the rod 5 and it is this frictional engagement that it is dependent upon or which is utilized for the purpose of checking the rebound movement, the amount of friction exerted depending largely upon the tension of the springs 16. Compression of the springs 4 or downward movement of the chassis frame A with relation to the axles is not resisted by the rollers 10 as the rod 5 will, during such movement, pass upwardly between the chain links and the rollers supported thereby. The movement will therefore be free and unrestricted and the cushioning effect of the springs will not in any way be interfered with. Rebound or upward movement of the chassis frame with relation to the springs will, however, be checked as the rod is then pulled downwardly between the chain links and the rollers carried thereby, thus tending to extend the links and simultaneously to increase the tension of the springs 16. An enormous roller friction and pressure is thus exerted on the opposite sides of the rod and the rebound movement may be checked to practically any extent desired.

By referring to Fig. 4, which is an enlarged detail view of the rod 5, the chain links and the rollers carried thereby, it can readily be seen that extension of the chain links permits each pair of links to exert a toggle lever action on the rollers, and a pinching action on the bar 5, due to the fact that the rollers 10 are brought into forceful engagement with the opposite sides of the rod. The casing 7 inclosing the chain links always has a tendency to move downwardly on the rod; first, due to the pull of the springs 16, and secondly, due to the gravity effect caused by the weight of the casing proper and as the lowermost link $9^b$ is attached to the casing and the uppermost link to the crank arm 12, it can readily be seen that a pinching action is always exerted on the rod, which will tend to check downward movement of the rod between the rollers.

The device here shown is exceedingly simple and substantial in construction and is so constructed that it may be readily applied to any standard vehicle in use today both with relation to the front and to the rear springs.

In the present instance I show the lower plate 6 to which the rod 5 and the springs 16 are secured as being rigidly held to the axle by means of the spring clips 18. I, however, wish it understood that any other suitable fastening means may be resorted to if desired; similarly, that the pin 13 supporting the crank arm 12 may also be otherwise supported, if desired.

By referring to Figs. 3 and 4, it will be seen that I provide a stop pin 19. This pin passes through the upper end of the rod 5 and is provided for the purpose of serving as a positive stop which will prevent the rod from being pulled out from between the rollers 10 and the chain links supporting the same, said stop member serving the further function of positively limiting rebound movements so that separation of the axle and chassis frame cannot take place beyond a certain point.

While a more or less specific mechanism is here shown, I wish it understood that various changes in design and proportions may be resorted to within the scope of the appended claims; similarly, that the materials and finish of the several parts employed may be such as the judgment and experience of the manufacturer may dictate.

Having thus described my invention, what I claim and desire to secure by Letters Patent is—

1. A shock absorber comprising a bar adapted to be secured at one end to a movable member, a second movable member, said member consisting of a plurality of hingedly connected toggle links, and friction members carried by each link engageable with opposite sides of the bar, said friction members resisting movement of the bar in one direction and permitting free movement of the bar in the opposite direction.

2. A shock absorber comprising a bar adapted to be secured at one end to a movable member, said bar having opposed flat parallel faces formed thereon, a second movable member, a series of rollers carried by said second movable member frictionally engageable with opposite sides of the bar, said rollers resisting movement of the bar between the rollers in one direction and permitting free movement in the opposite direction, and means for normally maintaining the rollers in frictional engagement with the bar.

3. A shock absorber comprising a vertically disposed bar adapted to be attached at its lower end to the axle of a vehicle, a series of toggle links adapted to be attached to the chassis of a vehicle, rollers carried by said toggle links, between which the free end of the bar extends, and means for exerting a downward pull on the free end of the toggle links.

4. A shock absorber comprising a bar adapted to be secured at one end to a movable member, a second movable member, a plurality of chain links pivotally attached to said second named movable member, a series of rollers journaled between the chain links and engageable with opposite sides of the bar, and means for exerting a downward pull on the free end of the chain links.

5. A shock absorber comprising a bar adapted to be secured at one end to a movable member, a second movable member, a plurality of chain links pivotally attached to said second named movable member, a series of rollers journaled between the chain links and engageable with opposite sides of the bar, means for exerting a downward pull on the free end of the chain links, a casing closing the chain links, the rollers and the bar, a pivotal connection between the casing and the lowermost link, and a spring adapted to exert a pull between the casing and the first named movable member.

6. The combination with a pair of opposed reciprocating members, of a rod attached to and movable with one member, a series of rollers supported by the opposite movable member and engageable with opposite sides of the bar, and means for exerting pressure on the rollers when the rod is moved in one direction, said means adapted to relieve said pressure when the rod is moved in the opposite direction.

7. The combination with a pair of movable members, of a rod attached to one movable member, a plurality of chain links between which the opposite end of the rod extends, a pivotal connection between one end of the links and the opposite movable member, a plurality of rollers carried by the chain links engageable with opposite sides of the bar, a casing inclosing the chain links and the bar, a pivotal connection between the opposite end of the chain links and the casing, and a spring forming a connection between the casing and the first named movable member.

8. The combination with a pair of movable members, of a rod attached to one movable member, a plurality of chain links between which the opposite end of the rod extends, a pivotal connection between one end of the links and the opposite movable member, a plurality of rollers carried by the chain links engageable with opposite sides of the bar, a casing inclosing the chain links and the bar, a pivotal connection between the opposite end of the chain links and the casing, a spring forming a connection between the casing and the first named movable member, and a pin carried by the free end of the bar, adapted to limit the movement of the bar with relation to the chain links.

9. In a shock absorber of the character described two opposed reciprocating members, a bar fixed at one end to one of said members, a casing fixed to the opposite member and through which the free end of the bar is slidable, toggle links hingedly connected within the casing, said toggle links being attached at one end to the casing and at the opposite end to the member which supports the rod, rollers journaled between the links and engaging opposite sides of the bar, and springs connecting the casing with the movable member opposed to that member, to which the rod is pivotally attached.

In testimony whereof I have hereunto set my hand in the presence of two subscribing witnesses.

CHARLES F. RODIN.

Witnesses:
W. W. HEALEY,
M. E. EWING.